United States Patent
Coupal et al.

(10) Patent No.: US 7,710,892 B2
(45) Date of Patent: May 4, 2010

(54) SMART MATCH SEARCH METHOD FOR CAPTURED DATA FRAMES

(76) Inventors: Dominic Coupal, 100 #707, Verdun, Q.C. (CA) H4G 3N1; Steven R. Klotz, 11005 Callanish Park Dr., Austin, TX (US) 78750; Venkata Rama Mohana Rao Kotturu, 7198 Galli Ct., Apartment 4, San Jose, CA (US) 95129

( * ) Notice: Subject to any disclaimer, the term of this patent is extended or adjusted under 35 U.S.C. 154(b) by 862 days.

(21) Appl. No.: 11/530,319

(22) Filed: Sep. 8, 2006

(65) Prior Publication Data
US 2008/0062989 A1    Mar. 13, 2008

(51) Int. Cl.
*H04L 12/26* (2006.01)
*H04L 12/56* (2006.01)

(52) U.S. Cl. ...................... 370/252; 370/392
(58) Field of Classification Search .............. 370/252, 370/254, 255, 392
See application file for complete search history.

(56) References Cited

U.S. PATENT DOCUMENTS

| | | | |
|---|---|---|---|
| 5,347,524 A | 9/1994 | I'Anson | 371/29.1 |
| 5,850,386 A * | 12/1998 | Anderson et al. | 370/241 |
| 5,850,388 A | 12/1998 | Anderson | 370/252 |
| 6,122,757 A | 9/2000 | Kelley | 714/39 |
| 6,219,050 B1 | 4/2001 | Schaffer | 345/340 |
| 6,493,761 B1 | 12/2002 | Baker | 709/230 |
| 6,665,725 B1 | 12/2003 | Dietz | 709/230 |
| 6,931,574 B1 * | 8/2005 | Coupal et al. | 714/39 |
| 6,954,789 B2 | 10/2005 | Dietz | 709/224 |
| 2006/0023638 A1* | 2/2006 | Monaco et al. | 370/252 |
| 2006/0256726 A1* | 11/2006 | Jennings | 370/241 |

FOREIGN PATENT DOCUMENTS

JP    02002281111 A    9/2002

* cited by examiner

*Primary Examiner*—Hong Cho

(57) ABSTRACT

Embodiments disclose a method and computer program products for automatically generating a list of search criteria to be used by the computing system when searching captured data frames for one or more resulting data frames having a specific protocol field. The method includes an act of accessing a specific protocol field from one of the captured data frames and an act of accessing protocol definitions. The captured data frame is then interpreted using the protocol definitions to generate a list of additional protocol field and value pairs to use for searching the captured data frames. Finally, the specific protocol field and the list of additional protocol field and value pairs are used to automatically identify the one or more resulting data frames having the specific protocol field.

18 Claims, 11 Drawing Sheets

| | mm:ss:ms_us_ns (R) | DT/Port | Port | Summary | Bytes | Destinat | Source | LUN |
|---|---|---|---|---|---|---|---|---|
| Beg | | | | | | | | |
| FR | 00:00.000_007_087 | | Channel 1-B | Good; | 48 | 000001 | 0000EF | |
| FR | 00:00.000_089_025 | | Channel 1-A | Read(10); LUN + 0x0000; LBA = 0x00002A00;FCP_DL = 0x00010000; | 68 | 0000EF | 000001 | 0000 |
| Bm | 00:00.001_039_200 | 1032.113 | Channel 1-B | SCSI Data; Offset = 0x0000D800; Len = 0x800 | 6/2084 | 000001 | 0000BC | |
| FR | 00:00.001_059_113 | 19.912 | Channel 1-B | SCSI Data; Offset = 0x0000E800; Len = 0x800 | 6/2084 | 000001 | 0000BC | |
| FR | 00:00.001_079_025 | 19.912 | Channel 1-B | SCSI Data; Offset = 0x0000F000; Len = 0x800 | 6/2084 | 000001 | 0000BC | |
| FR | 00:00.001_098_975 | 19.950 | Channel 1-B | SCSI Data; Offset = 0x0000F800; Len = 0x800 | 6/2084 | 000001 | 0000BC | |
| FR | 00:00.001_118_975 | 19.913 | Channel 1-B | Good; | 48 | 000001 | 0000BC | |
| FR | 00:00.001_138_763 | 19.875 | Channel 1-B | SCSI Data; Offset = 0x00000000; Len = 0x800 | 6/2084 | 000001 | 0000BC | |
| Bm | 00:00.001_150_238 | 11.475 | Channel 1-B | SCSI Data; Offset = 0x00000800; Len = 0x800 | 6/2084 | 000001 | 0000BC | |
| FR | 00:00.001_170_150 | 19.912 | Channel 1-B | SCSI Data; Offset = 0x00001000; Len = 0x800 | 6/2084 | 000001 | 0000BC | |
| FR | 00:00.001_190_063 | 19.913 | Channel 1-B | SCSI Data; Offset = 0x00001800; Len = 0x800 | 6/2084 | 000001 | 0000BC | |
| FR | 00:00.001_209_975 | 19.912 | Channel 1-B | | | | | |

*Fig. 3A*

| Index | Hex | Interpretation |
|---|---|---|
| FC 0001 | BC B5 56 56 | SOF = SOF13; |
| FCH 0001 | 06 00 00 BC | RCtl = FC4Cmd; D_Id = 0x0000BC; |
| FCH 0002 | 00 00 00 01 | CS_CTL = 0x00; S_Id = 0x000001; |
| FCH 0003 | 08 29 00 00 | Type = SCSI FCP; RX/OX = OX; S_C = S_C_I, F_S; E_S; TSI; |
| FCH 0004 | 95 00 00 00 | SEQ_Id = 0x95; DF_Ctl = No Opt Header; SEQ_Cnt = 0x0000; |
| FCH 0005 | 01 4A FF FF | OX_Id = 0x014A; RX_Id = 0xFFFF |
| FCH 0006 | 00 00 00 00 | PARA = 0x00000000; |
| SCSIc 0001 | 00 00 00 00 | LUN = 0x0000; |
| SCSIc 0002 | 00 00 00 00 | |
| SCSIc 0003 | 00 00 00 02 | Cmd Reference Number = 0x00; Task Attribute = SQ; AddCDBLen = 0; |
| CDB 0001 | 28 00 00 00 | SCSI Cmd = Read(10); RD Protect = 0x0; FUA_NV = 0x0; LBA = 0x00000800; Read Data |
| CDB 0002 | 08 00 00 00 | Group Number = 0x0; Transfer Length = 0x0080; |
| CDB 0003 | 80 00 00 00 | VS = 0x0; |
| CDB 0004 | 00 00 00 00 | |
| SCSIc 0001 | 00 00 00 00 | FCP_DL = 0x00010000; |
| End 0001 | 9B A0 9E 0C | CRC = 0x9BA09E0C; |
| End 0002 | BC 95 75 75 | EOF = EOFt(-); |

SMART MATCH SEARCH METHOD FOR CAPTURED DATA FRAMES

CROSS-REFERENCE TO RELATED APPLICATIONS

Not applicable.

BACKGROUND

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Ethernet, Token Ring, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types have different sets of standards, referred to as protocols, which set forth the rules for accessing the network and for communicating among the resources on the network.

However, many of the network types have similar characteristics. For the most part, digital data are usually transmitted over a network medium via frames (also referred to as "data frames" or "data packets") that can be of a fixed or a variable length. Typically, data frames have headers and footers on the two ends of the frame, and a data portion disposed in the middle. The specific layout of these data frames is typically specified by the "physical layer protocol" of the network being used. For example, the Ethernet physical layer protocol specifies that the structure of a data frame include a preamble field, a six-byte destination address field, a six-byte source address field, a two-byte type field, a data field having a variable size (46-1,500 bytes), and a four-byte error checking field. Other physical layer protocols will specify similar types of frame layouts.

As is well known, transmissions from one network connected device to another device are typically passed through a hierarchy of protocol layers. Each layer in one network connected device essentially carries on a conversation with a corresponding layer in another network connected device with which the communication is taking place and in accordance with a protocol defining the rules of communication.

For example, one well-known protocol standard is the Open Systems Interconnection (OSI) Model. OSI defines a seven-layer protocol model, which is widely used to describe and define how various vendors' products communicate. In that model, the highest network layer is the Application Layer. It is the level through which user applications access network services. The next layer is the Presentation Layer which translates data from the Application Layer into an intermediate format and provides data encryption and compression services. The next layer is referred to as the Session Layer, which allows two applications on different network connected devices to communicate by establishing a dialog control between the two devices that regulates which side transmits, when each side transmits, and for how long. The next layer, the Transport Layer, is responsible for error recognition and recovery, repackaging of long messages into small packages of information, and providing an acknowledgement of receipt. The next layer is the Network Layer, which addresses messages, determines the route along the network from the source to the destination computer, and manages traffic problems, such as switching, routing and controlling the congestion of data transmissions.

It is the next layer, referred to as the Data Link Layer, which packages raw bits into the logical structured data packets or data frames, referred to above. This would correspond, for example, to the Ethernet physical layer protocol noted above. This layer then sends the data frame from one network connected device to another. The lowest layer in the hierarchal model is the Physical Layer, which is responsible for transmitting bits from one network connected device to another by regulating the transmission of a stream of bits over a physical medium. This layer defines how the cable is attached to the network interface card within the network connected device and what transmission techniques are used to send data over the cable.

Thus, as a message is passed down through each of these respective layers, each layer may add protocol information to the message. Thus, the "data" present within the data payload of the data frame at the Data Link Layer (e.g., the Ethernet data frame) typically comprises a protocol stack comprised of multiple message packets. Each message packet has its own protocol format, and it may in turn be embedded within the data payload of another higher layer message, also having a different protocol.

As communication networks have increased in number and complexity, the networks have become more likely to develop a variety of problems, which are in turn more and more difficult to diagnose and solve. For example, network performance can suffer due to a variety of causes, such as the transmission of unnecessarily small frames of information, inefficient or incorrect routing of information, improper network configuration and superfluous network traffic, to name just a few. Such problems are compounded by the fact that many networks are continually changing and evolving due to growth, reconfiguration and introduction of new network typologies and protocols as well as new interconnection devices and software applications.

Consequently, diagnostic equipment, commonly referred to as "network protocol analyzers," have been developed for capturing, analyzing, and displaying information about data frames that are transmitted over a network. Typically, protocol analyzers are designed to identify, analyze and resolve interoperability and performance problems in different networks typologies and protocols. For example, the equipment enables users to perform a wide variety of network analysis tasks, such as counting errors, filtering frames, generating traffic and triggering alarms.

To do so, a protocol analyzer typically has the capability to capture all of the physical layer data frames (packets) generated by other stations (nodes) on the network. The analyzer is then designed to evaluate the contents of each data frame and, preferably, display the contents along with a meaningful description, and preferably in the sequence in which they were captured from the network. The analysis data that can be displayed with each captured data frame can include a variety of information, including the time at which the packet was captured, the length of the packet, packet address information for one or more protocol layers, and a set of protocol decodes at each layer that the protocol analyzer is capable of decoding.

Typically, the number of data frames captured by the network analyzer is quite large, sometimes numbering in the millions and billions. To help analyze all this data, various capture viewing software tools have been developed to aid the user. A typical usage of the capture viewing software tools is to search for a specific protocol field value in all the frames of a capture. For example, in a capture of SCSI traffic over Fibre Channel, it is typical to isolate all the frames for a specific LUN (SCSI Logical Unit Number) value.

One common software tool simply searches for a specific protocol field at a fixed byte offset location in all the captured data frames. For example, if a user desired to search for a LUN field value of 0x0000 at byte offset 28, the user would input this into the software as a search field. The software would then cause all the captured data frames to be searched for the value of 0x0000 at byte offset 28 whether the data frames were SCSI Command frames or not. The returned values typically would include many false positives as any data frame with the value of 0x0000 at byte offset 28 would be returned, even if the frames did not contain a LUN value. Accordingly, this method is very fast, but not very accurate.

Another common software tool decodes every data frame one-by-one and isolates only those data frames with the desired field. For example, if a user desired to search for a LUN field value of 0x0000, the user would input this into the software as a search field. The software would then cause every data frame to be searched one-by-one. Only those data frames with a LUN field value of 0x0000 would be returned. However, searching each and every data frame may take hours for a large number of frames. Accordingly, this method is very accurate, but also very slow.

BRIEF SUMMARY

The embodiments disclosed herein relate to a computing system having access to a plurality of captured data frames present on a communication network that have been captured by a protocol analyzer. At least a subset of the captured data frames are search data frames that are to be searched, the search data frames being structured in accordance with different protocol definitions, the search data frames being structured to include one or more protocol fields structured in accordance with its corresponding protocol definition. The computing system also has access to a database of protocol definitions that define frame formats for the search data frames by specifying a relationship between the protocol fields of the search data frames.

The embodiments disclose a method and computer program products for automatically generating a list of search criteria to be used by the computing system when searching the search data frames for one or more resulting data frames having a specific protocol field. The method includes an act of accessing a specific protocol field from one of the captured data frames and an act of accessing the protocol definitions. The captured data frame is then interpreted using the protocol definitions to generate a list of additional protocol field and value pairs to use for searching the search data frames. Finally, the specific protocol field and the list of additional protocol field and value pairs are used to automatically identify the one or more resulting data frames having the specific protocol field.

An alternative embodiment discloses a method for analyzing protocol definitions to automatically generate a library of search criteria for use in searching at least some data frames for a specific kind of frame or protocol field. The method includes: displaying a graphical tree-like representation of a protocol definitions, wherein the graphical tree-like representation is configured such that sub-branches of the tree-like representation define protocol fields of at least some of the data frames and wherein sub-branches may be embedded within other sub-branches, receiving user interaction that selects a path of one or more sub-branches of the graphical tree-like representation in order to identify the one or more sub-branches defining a user desired specific kind of frame or protocol field, and identifying those key protocol fields that are commonly encountered in the path of the one or more sub-branches before encountering the one or more sub-branches defining the user desired kind of frame or specific protocol field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 3A-3F illustrate a specific embodiment of the present invention;

DETAILED DESCRIPTION

Figure 1:
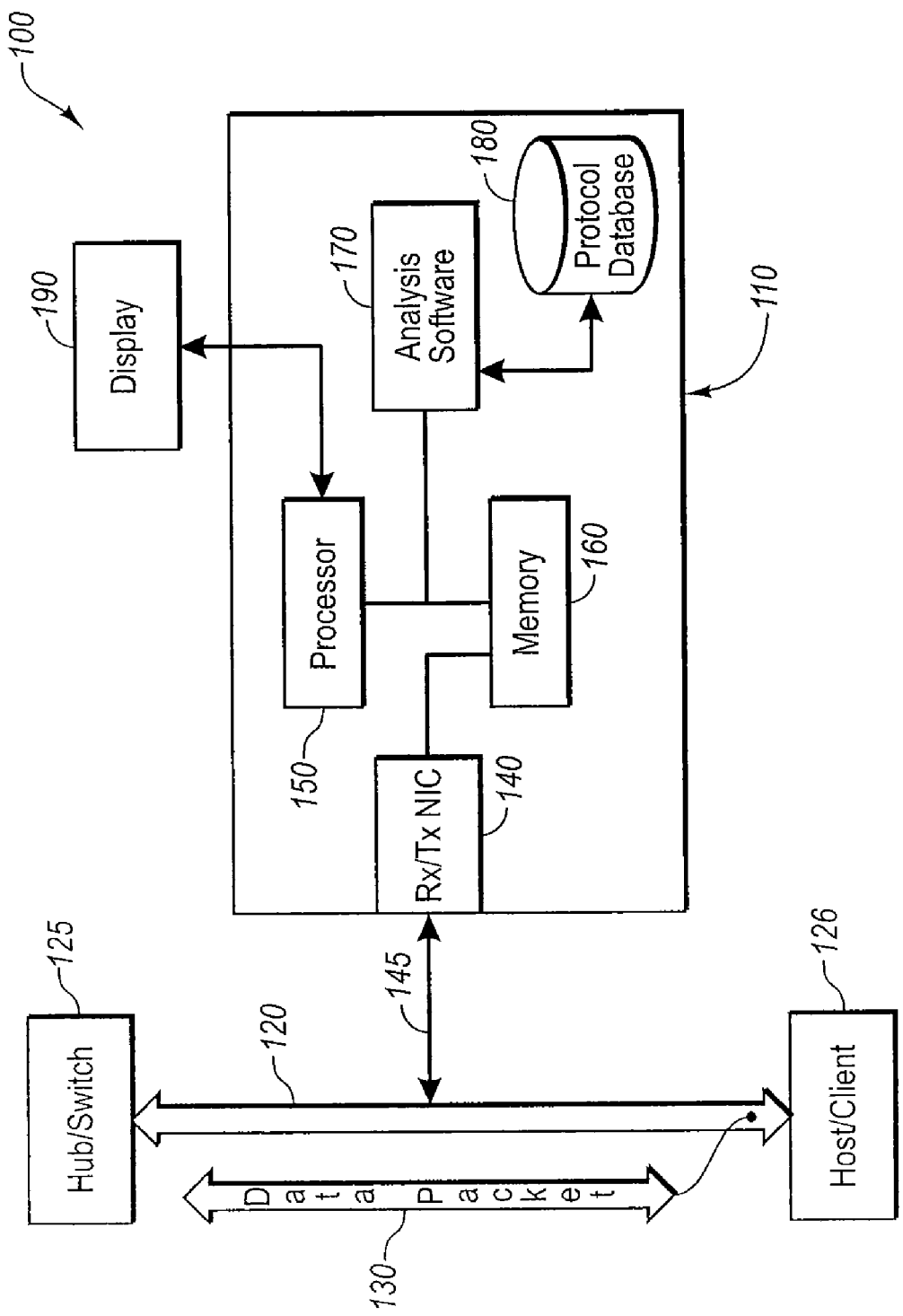
FIG. 1 illustrates one embodiment of an overall protocol analyzer system for analyzing data frames.

The embodiments described herein disclose a method and computer program products for automatically generating a list of search criteria to be used by the computing system when searching the search data frames for one or more resulting data frames having a specific protocol field. The method includes an act of accessing a specific protocol field from one of the captured data frames and an act of accessing the protocol definitions. The captured data frame is then interpreted using the protocol definitions to generate a list of additional protocol field and value pairs to use for searching the search data frames. Finally, the specific protocol field and the list of additional protocol field and value pairs are used to automatically identify the one or more resulting data frames having the specific protocol field.

As used herein, the terms "protocol analyzer" and "network analyzer" are used interchangeably and relate to devices having hardware or software for performing network troubleshooting, monitoring, network data analysis, network performance analysis, diagnosis, traffic simulation, bit error rate testing, network jamming, or other procedures that are conventionally performed by protocol analyzers or network analyzers. Protocol analyzers and network analyzers represent examples of special-purpose computers that can perform the operations associated with the methods described herein.

Embodiments also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM, DVD or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

Reference will now be made to the drawings to describe various aspects of the embodiments of the invention. It is to be understood that the drawings are diagrammatic and schematic representations of such embodiments, and are not limiting of the present invention, nor are they necessarily drawn to scale.

In the following description, numerous specific details are set forth in order to provide a thorough understanding of the present invention. It will be obvious, however, to one skilled in the art after having read this description that the present invention may be practiced without these specific details. In other instances, well-known aspects of network systems have not been described in particular detail in order to avoid unnecessarily obscuring the present invention.

In general, it will be appreciated that a preferred software environment is not limited to any particular hardware environment, nor must the software be used in connection with any one particular application. By way of example and not limitation, in one embodiment the software is described as being used in connection with a protocol analyzer type of device. It will be appreciated that this hardware functionality could be implemented entirely within a dedicated personal computer, such as a general purpose desktop or laptop personal computer (PC), or could be implemented within a dedicated protocol analyzer instrument having the appropriate processing capabilities. Or, as is the case of one embodiment, the hardware functionality could be implemented with a combination of the two environments; that is, a portion of the function is provided within a dedicated protocol analyzer device, which is then operably connected to, and controlled by, a separate general purpose personal computer (PC).

Thus, the first primary function of the hardware in one embodiment is to provide the physical computing platform for execution of the software portion of the invention. Secondly, the hardware platform provides the ability to electrically and physically interface with the network that is being monitored. In addition, the hardware preferably provides the ability to physically display a graphical user interface (GUI), such as a video display device (e.g., a standard cathode-ray tube monitor or liquid crystal display) and that provides the user with the ability to interact with the GUI, such as by way of common input devices such as a keyboard and a mouse.

Referring now to FIG. 1, an overall system view of one embodiment is generally designated at 100. In this particular embodiment, the system environment is centered on a network protocol analyzer device, which is designated generally at 110. As is well known, a protocol analyzer has a primary function of capturing, analyzing and displaying information about packets that are transmitted over a network. In the illustrated embodiment, the protocol analyzer 110 is shown as being operatively connected to a simplified communications network, designated generally at 120. For purposes of illustration, FIG. 1 depicts several network devices connected to the network, including a hub/switch 125 and a host/client 126. It will be appreciated that in a typical network environment, additional types of network devices would also be interconnected by way of the network 120.

FIG. 1 also depicts the presence of physical layer data packets, such as is depicted at 130, being transmitted over the network between the network-connected devices. The format of this data packet (also sometimes referred to as a "data frame" or a "network packet") will depend on the physical layer protocol being used, and it will be appreciated that the teachings of the present invention are applicable to any one of a number of protocol types.

The protocol analyzer device 110 illustrated in FIG. 1 also includes a interface card (NIC) 140 that allows for the physical and electrical interconnection with the network 120, as is depicted schematically at 145. Again, the type of network interface card used will depend on the physical layer protocol of the corresponding network 120. For an Ethernet network, for example, the NIC 140 is an Ethernet network interface card. Also, the network interface card 140 is configured so as to be operated in a promiscuous mode, such that it is able to capture all packets traversing the network 120. As is well known, the interface card 140 actually captures serial data bits from the network medium, and then assembles the data into the separate data frames in accordance with the relevant physical layer protocol.

Included within the protocol analyzer device 110 is an appropriate CPU or processor 150 and conventional internal memory 160, which are interconnected by a system bus in a manner well known in the art. Also, there is a suitable computer storage location, such as a magnetic storage medium, that contains the packet analysis software module, designed at 170. During execution, this software would typically be loaded into memory 160 for execution on the processor 150. Note that protocol analyzer 110 may also include various other components not discussed above.

Also included within a suitable memory location, such as a magnetic disk, is a protocol database storage location 180. This storage location may include the particular protocol definitions that "defines" the format packets traversing the network 120. Also included with the protocol analyzer 110 is an appropriate computer display 190 device, such as a cathode ray tube or liquid crystal display, for providing the necessary display capabilities for viewing the results of the packet analysis. Also, the device 110 includes any suitable input devices, such as a keyboard and a mouse device (not shown).

It will be appreciated that FIG. 1 is for illustration purposes oily, and should not be viewed as limiting the teachings of the present invention. First, protocol analyzer 110 could be implemented as a dedicated network analyzer device and as a single "self-contained" unit. Alternatively, the device 110 could be implemented exclusively within a general purpose personal computer (PC), such as a laptop computer having an appropriately configured NI module 140. Or, the device 110 could be implemented with a "stand-alone" network analyzer portion that connects to, and is controlled by, a general purpose PC, such as a laptop computer. With this approach, the analyzer portion would provide the physical interconnection to the network, and would provide some of the processing power for the analysis software. The PC would "control" the analyzer, and would provide some the graphic display, and well as the input capability. Moreover, the PC would be used to store captured information, and would include the protocol database functionality. The present invention can be implemented via any one of these implementation approaches.

Figure 2:
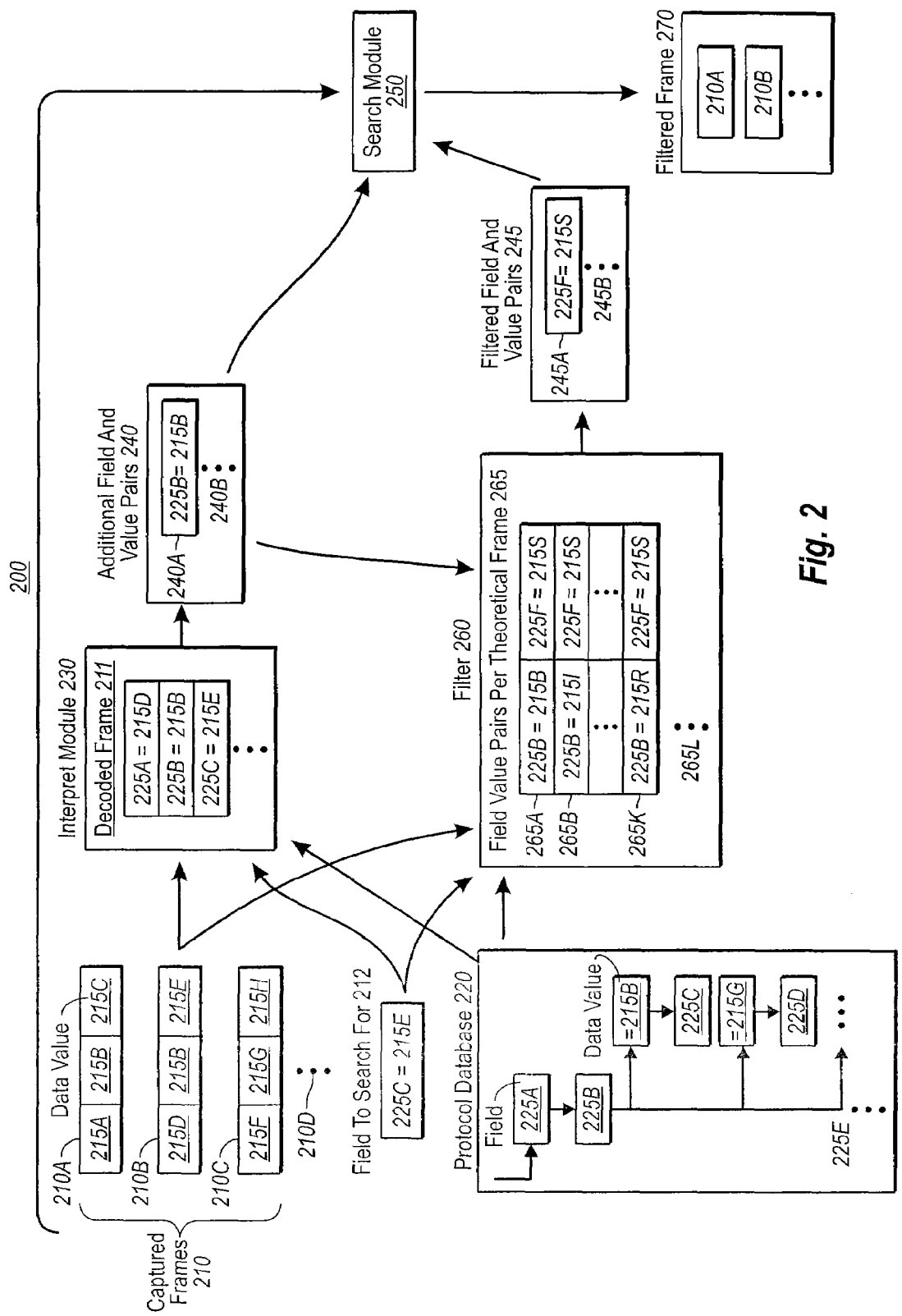
FIG. 2 illustrates a computing system in which the embodiments disclosed herein may be performed.

Turning now to FIG. 2, a computing system 200 that may be implemented to practice the embodiments disclosed herein is illustrated. Computing system 200 depicts various modules and components that may be used when implementing the embodiments. Note that computing system 200 is illustrated by way of example only and should not be used to limit the scope of the appended claims or any of the embodiments disclosed herein. The various modules and components of computing system 200 may be located in a protocol analyzer 110 or within a personal computer attached to control protocol analyzer 110 as described above. In some embodiments, the various modules and components of computing system 200 may be distributed across multiple computers interconnected via the internet or other wide area or local network.

As illustrated, computing system 200 includes a set of captured data frames 210 as illustrated by captured data frames 210A, 210B, 210C, and any number of additional captured data frames as illustrated by ellipses 210D. The data frames 210 are typically captured by a protocol analyzer such as protocol analyzer 110 and stored in analyzer memory 160. In some embodiments, the data frames comprising data frames 210 may have been captured by the protocol analyzer 110 in the past and stored in memory 160 for later analysis.

The captured data frames 210 may include one or more data values 215A-215H. The one or more data values 215 define various protocol headers and data messages that are defined in some protocol specification documents. Note that captured data frames 210A and 210B both include the $2^{nd}$ data value 215B. For the purpose of the embodiments disclosed herein, it will be assumed that they are similar data frames because a protocol specification document would identify the $2^{nd}$ data value as a key field. Captured data frame 210C, on the other hand, includes the $2^{nd}$ data value 215G, which leads to a different kind of frame than 210A and 210B because the $2^{nd}$ data value 215G is different than the 215B found in the two others.

As discussed above, it is often desirable for a user of protocol analyzer 110 to search for a specific protocol field in at least a subset of the captured data frames 210. Accordingly, a specific protocol field of one of the captured data fields is specified by a user of protocol analyzer 110. Alternatively, the computing system 200 may specify the specific protocol field. For example, in a capture of SCSI traffic over Fibre Channel, the specific protocol field may be a SCSI Logical Unit (LUN) or a Logical Block Address (LBA) field.

An interpret module 230 of computing system 200, which may be comprised of hardware, software, or any combination of the two then accesses the specific protocol field by also accessing the captured data frame 210 that includes the specific protocol data field. As illustrated in FIG. 2, the specific protocol field is protocol field 225C of captured data frame 210B. Note that this is for illustration only as any of the other protocol fields of the other captured data frames 210 may also be specified as the specific protocol field to search for.

The accessed data frame 210B is used to give context to the search to be performed. In other words, the data frame 210B allows computing system 200 to ascertain the types of the data frames for which similar data frames will be searched. For example, if the specific protocol field 225C were a LUN protocol field, then data frame 210B would be a SCSI over Fibre Channel data frame. In other words, the presence of the LUN field implies that computing system 200 will search for a SCSI over Fibre Channel frame and not other types of frames such as IP-over-Fibre Channel for example.

Computing system 200 also includes a protocol database 220, which may correspond to protocol database 180 of FIG. 1. Protocol database 220 includes one or more protocol definitions corresponding to protocol fields 225A to 225D, and any number of additional protocol definitions as represented by ellipses 225E. The protocol definitions in protocol database 220 define frame formats for at least a subset of the captured data frames 210 by specifying the interrelationships between the protocol fields 225 that are included in the data frames 210. In some embodiments, the protocol definitions may be structured in a tree-like hierarchical structure. Details regarding one embodiment of the actual format of the protocol definitions in the protocol database 220 and examples of a tree-like hierarchical structure are found in commonly assigned U.S. Pat. No. 6,931,574 entitled "Systems and Methods for Interpreting Communications Packets", which was filed on Oct. 24, 2001, and which is incorporated herein by reference in its entirety.

As illustrated, interpret module 230 receives three inputs: the field to search for 212, the capture frame 210B and the protocol database 220. It decodes the captured frame 210B to generate a decoded frame 211 using the protocol definitions in the protocol database 220, until the field to search for 212 is reached. So the tree hierarchy of the protocol definitions starts with field 225A, then the $1^{st}$ data value 215D in frame 210B is assigned to field 225A in the decoded frame 211. Then the next protocol definition is field 225B, so it gets assigned the $2^{nd}$ data value 215B. Field 225B is a branch point in the protocol definitions. If it is equal to the data value 215B, then the $3^{rd}$ field is 225C. If it is equal to the data value 215G, then the $3^{rd}$ field is 225D. Because of that, Field 225B=215B is added to the output list of additional protocol field value pairs 240. Then since 225B is equal to 215B, then the next field is 225C and it is assigned the $3^{rd}$ data value 215E. The field 225C is the input field to search for 212. The interpretation module 230 has finished generating the output of additional protocol field value pairs 240.

As illustrated, the list 240 may include a protocol field and value pair 240A, with any number of additional protocol field and value pairs illustrated by ellipses 240B. Note that the actual number of protocol field and value pairs 240 that will be generated is dependent on how the data frame 210B is defined by protocol database 220.

The specific protocol field 225C and one or more additional protocol field and value pairs 240 are then provided to a search module 250, which may be implemented as hardware, software, or any combination of the two. It should be noted that in some embodiments the process of generating the additional protocol field and value pairs 240 may be an iterative process. In other words, the interpret module 230 may identify additional protocol field and value pairs 240 during one time period and may then add or eliminate additional protocol field and value pairs at a later time period. Accordingly, the actual additional protocol field and value pairs 240 that are ultimately provided to search module 250 need not have been identified at the same time or include all additional protocol field and value pairs that have been identified.

The search module 250 uses the specific protocol field 225C and the one or more additional protocol field and value pairs to automatically search at least some of the captured data frames 210 for those that also include the specific protocol field 225C. For example, as illustrated in FIG. 2, captured data frame 210A would also include specific protocol field 225C once decoded with the protocol database 220 and would thus be identified by search module 250. On the other hand, captured data frame 210C would not include specific protocol field 225C once decoded and so would not be identified by search module 250. The data frames that are identified by search module 250 may then be displayed to user on a display device such as display 190.

Accordingly, the process just described allows computing system 200 to quickly search for only those data frames that include a desired protocol field. Since the additional protocol field and value pairs 240 are automatically determined by the computing system in a first step, then those search criterions are used to search very efficiently for other frames in a second step in search module 250, the resulting search having a high level of accuracy without sacrificing the speed of the search. In addition, since the additional protocol field and value pairs 240 are determined at least in part based on the protocol definitions in the protocol database 220, there is no need to hard code any protocol field and value pairs in the underlying code of the search software. Instead, any changes to the protocol database 220 will automatically be propagated to interpret module 230 and search module 250.

Referring again to FIG. 2, some embodiments include a filter 260, which may be implemented in hardware, software, or any combination of the two, that may be used to remove additional protocol fields and value pairs 240 prior to providing these values to search module 250. As illustrated, additional protocol field and value pairs 240A and 240B may be generated by interpret module 230 as previously described and provided to filter 260. The filter 260 may be configured to ascertain the number of data values 215 that a particular protocol field 225 can have in different frames for which the field to search for 212 would be present. As will be illustrated in more detail to follow, given a field to search for 212, if filter 260 determines that a particular protocol field can have more than a predetermined number of data values, such as ten in some embodiments, then it removes all protocol field and value pairs that include that protocol field.

In additional field and value pairs 240, assume that the ellipses 240B corresponds to another field value pair 225F=215S. So the filter 260 has two field value pairs as input, one for 225B=215B and another for 225F=215S. To filter out some field-value pairs, the filter 260 reads the protocol definitions and finds all the possible values for fields 225B and 225F. In the protocol database 220, two values are possible for field 225B: 215B, 215G.

Further assume that the ellipses correspond to 18 more possible values, and assume that the field 225F has also 20 possible values. Then the filter 260 produces theoretical frames 265 for all combinations of values for fields 225B and 225F and it retains the theoretical frames for which the Field to search for 212 can be reached. Then filter 260 produces one list of field-value pairs per theoretical frame retained, and only keeps the common subsets of fields in all lists, but each field might have more than one value. So further assume that 11 lists contain both fields 225B and 225S, for which field 225B has 11 different values, but field 225S has only one value. According to the previous section, the field 225B is eliminated by filter 260 because it has more than 10 possible values. So the resulting filtered field and value pairs 245 contains only one field-value pair: 225F=215S.

That filtered field-value pair may then be provided to search module 250 and used for searching data frames 210 as previously described. Note however that if the field 225B had only 9 possible values as opposed to 11, then they would be retained in the output 245. In that case, the search module 250 would have to match one of 9 possible values for field 225B, and 1 possible value for field 225F to identify a valid filtered frame in output 270.

Figure 3C:
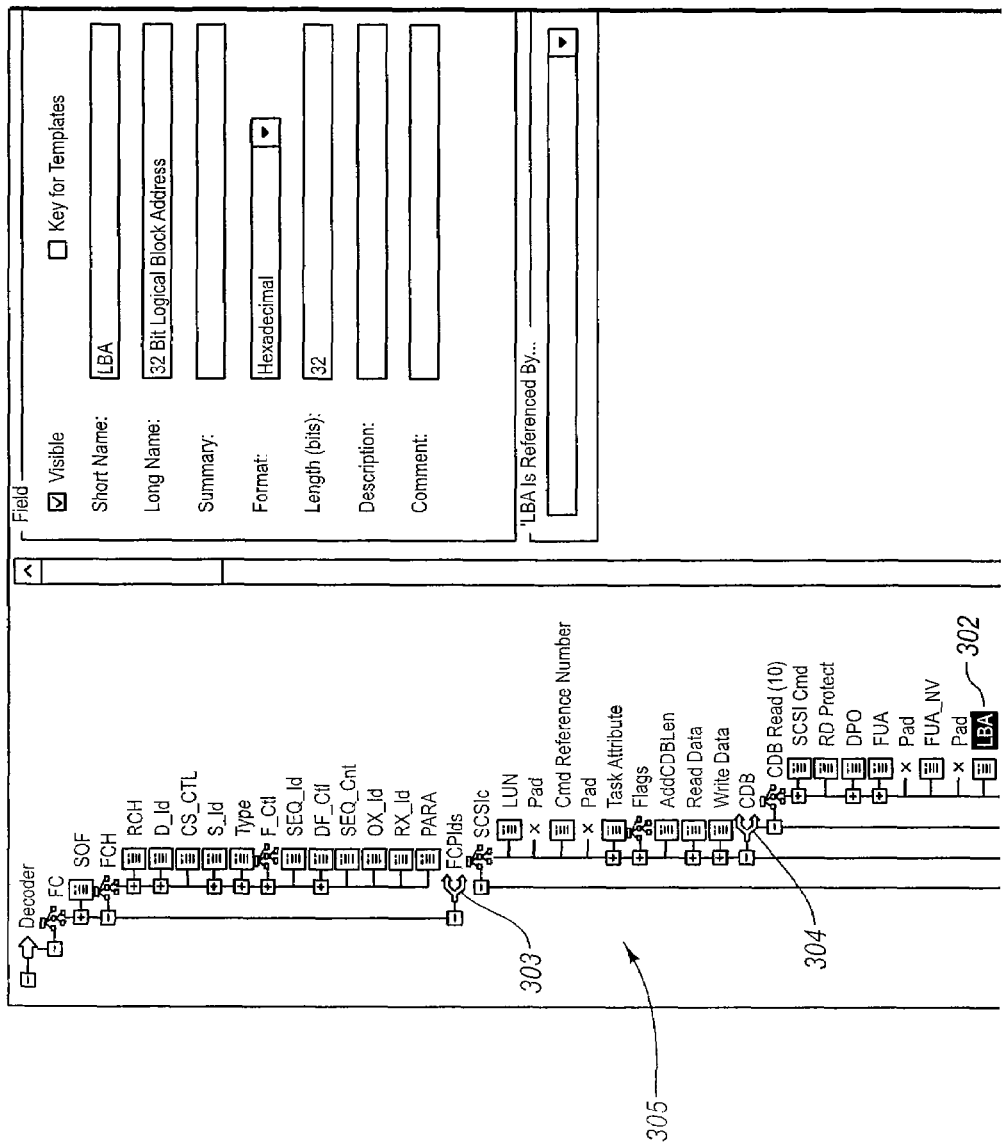

Referring now to FIGS. 3A-3F, a specific embodiment of the search process described in relation to FIG. 2 is illustrated. FIG. 3A illustrates a graphical user interface that displays a number of data frames 310 such as captured data frames 210 that have been captured by a protocol analyzer such as analyzer 110.

As mentioned, above a specific protocol field of a captured data frame is accessed. FIG. 3B illustrates a data frame 301 of the data frames 310. Data frame 301 includes a specific protocol field 302 that may be accessed by a computing system that is accessing data frame 301. Note that the specific protocol field in this example is a LBA=0x00000800, which may by shortened to 0x800 for simplicity.

As mentioned above, a protocol database for decoding data frame 301 is also accessed. FIG. 3C illustrates an example protocol database 305 that is configured as a hierarchical graphical tree-like structure. Note that the tree-like structure includes various branch points 303 and 304 that are marked with the icon. These branch points are points or sub-branches of the tree-like structure that are common to any path of the tree leading to a location of the specific protocol field 302. Note that protocol database 305 may include other branch points that are not illustrated in FIG. 3C.

Figure 3D:
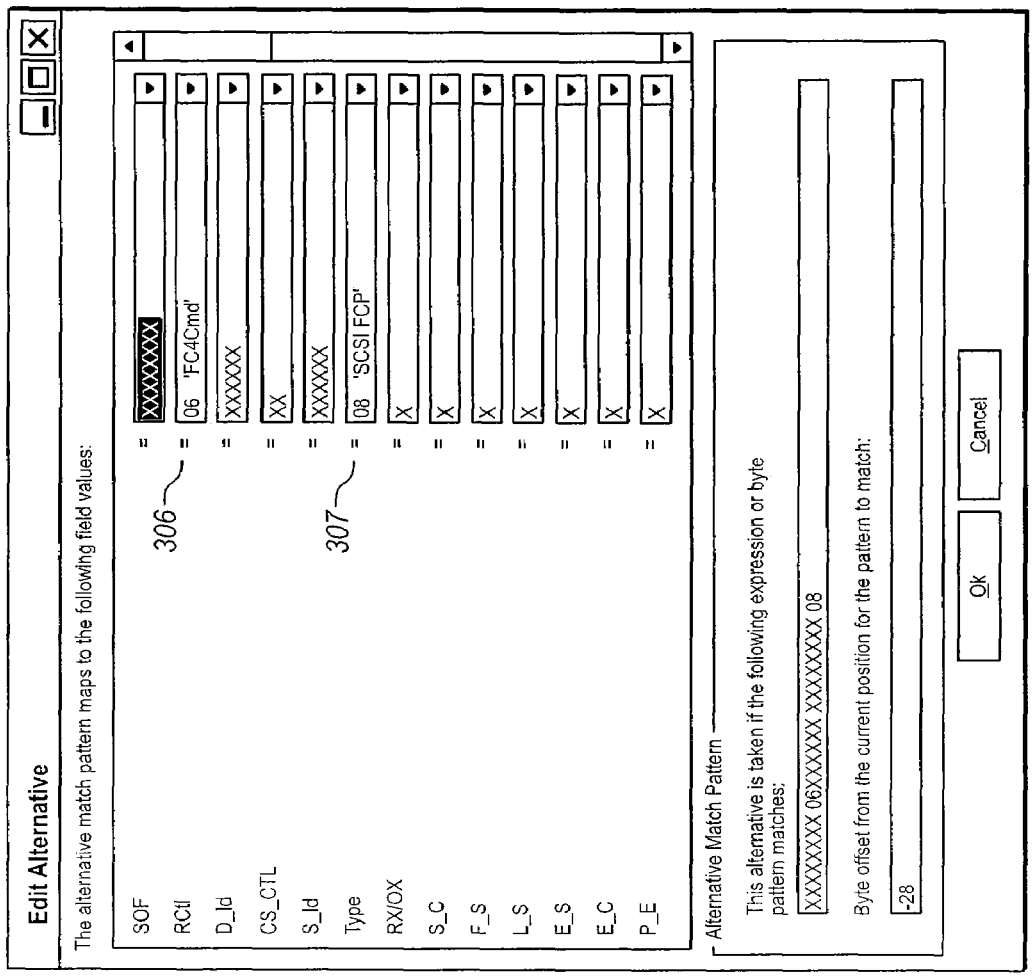
Figure 3E:
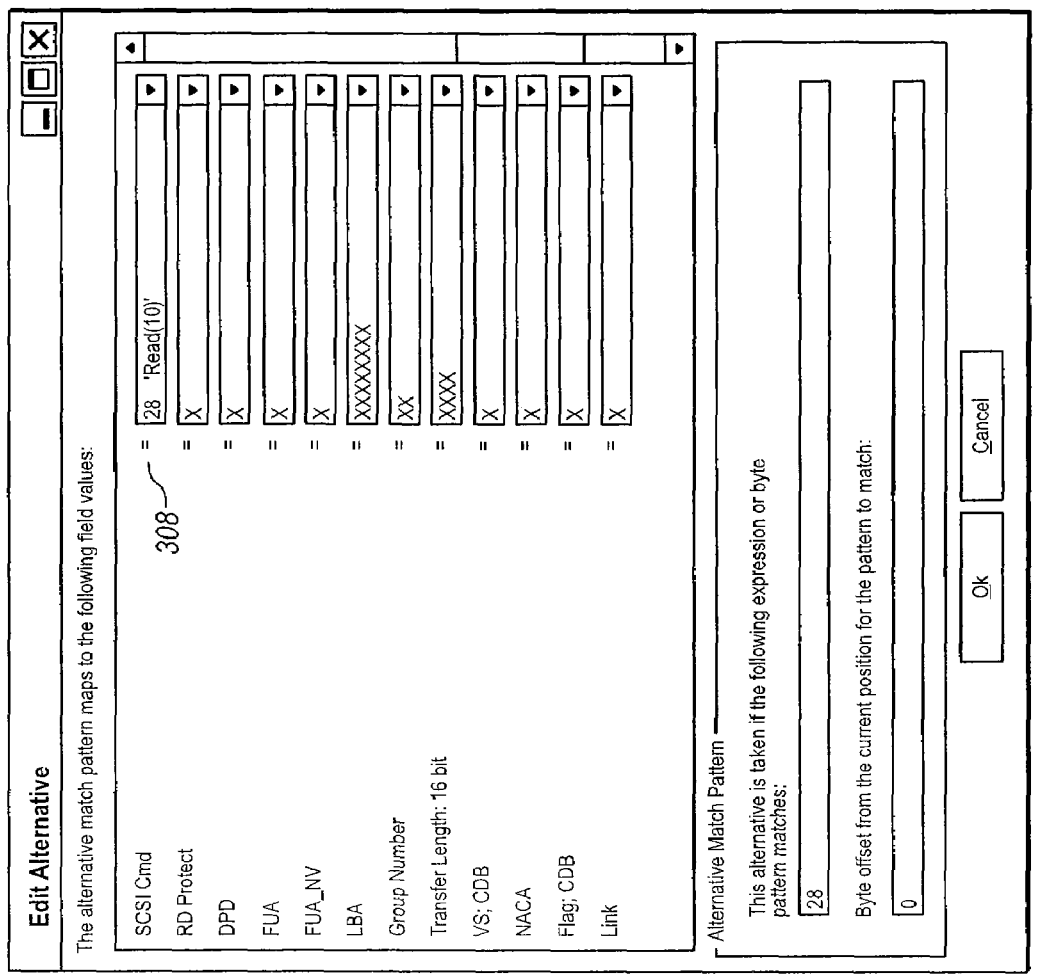

The data frame 301 is interpreted using protocol database 305 to identify the common branch points. In the current example, the branch for a SCSIc (SCSI Command) item is taken when the field RCtl=0x06 (denoted as 306) and the field Type=0x08 (denoted as 307) as illustrated in FIG. 3D. Further, the branch for CDB Read (10) (denoted as 308) is taken when SCSI Cmd=0x28 as is illustrated in FIG. 3E. Thus, the common branch points are identified to be: RCtl=0x06, Type=0x08, and SCSI Cmd=0x28. The common branch points may correspond to the additional protocol field and value pairs 240 discussed above.

In some cases, using the common branch point fields found above to search for LBA=0x800 may be too restrictive. To determine this, substantially all possible values of the branch points identified above are found based on the protocol database 305.

In the present example, based on the protocol database 305, the following illustrate some possible values for the RCtl command branch point:

| | |
|---|---|
| 0x00 | FC4Uncat |
| 0x01 | FC4SData |
| 0x02 | FC4UCtl |
| 0x03 | FC4SCtl |
| 0x04 | FC4UData |
| 0x05 | FC4XRdy |
| 0x06 | FC4Cmd |
| 0x07 | FC4Status |
| 0x22 | ExtLinkReq |

In addition, based on the protocol database 305, the following illustrate some possible values for the Type common branch point:

| | |
|---|---|
| 0x01 | EX_LNK_SRV |
| 0x04 | LLC/SNAP IOD |
| 0x05 | LLC/SNAP OOD |
| 0x08 | SCSI FCP |
| 0x09 | SCSI GPP |

Finally, based on the protocol database 305, the following illustrate some possible values for the SCSI Cmd common branch point:

| | |
|---|---|
| 0x28 | Read (10) |
| 0x2A | Write (10) |
| 0xA8 | Read (12) |
| 0xAA | Write (12) |
| 0x36 | Lock/Unlock |
| 0x3E | Read Long |
| 0x25 | Read Capacity |
| 0x52 | XDRead |
| 0x50 | XDWrite |
| 0x81 | Rebuild |
| 0x82 | Regenerate |
| 0x80 | XDWriteEx |

Next, based on the protocol database 305, one or more data frames that include the different values for the common branch points are generated. In the present example, RCtl has 9 possible values, Type has 4; SCSI Cmd has 12, so at least 25 frames are generated. As mentioned, these data frames are not captured data frames, but are instead data frames generated by the computing system based on the protocol database 305 that are similar to data frame 301.

The resulting set of generated data frames are then analyzed based on the protocol database 305 to ascertain that those generated data frames include the specific protocol field LBA=0x800 (302). The generated data frames that do include LBA=0x800 (302) are then interpreted using the protocol database 305 to once again find common branch points as described above. In the present example, the common branch points, or additional protocol field and value pairs, are found to be: RCtl=0x06, Type=0x08, and SCSI Cmd={0x28 or 0x2A or 0xA8 or 0xAA or 0x36 or 0x3E or 0x25 or 0x52 or 0x50 or 0x81 or 0x80 or 0x82}.

The number of values a particular branch point has is then ascertained. In the present example, if the number of values is found to be above a predetermined number, such as 10 in some embodiments, then that protocol field and all its corresponding values are eliminated as search criteria. For instance, in the present example, since the SCSI Cmd field has 12 different values, it is removed from the list of search criteria.

The remaining two branch points RCtl=0x06 and Type=0x08 are provided to a search module such as search module 250 for use in searching for additional data frames 310 that include specific protocol field LBA=0x800 (302). In some embodiments, these branch point fields are translated into fixed-length values at fixed offset locations in frame 301. For instance, in the present example for the RCtl field the translation may be: value at byte offset 4, byte length 1=0x06. The translation for the Type field may be: value at byte offset 12, byte length 1=0x08. The Fixed-length values at fixed offsets can be then used to find data frames 310 that are similar to data frame 301. In code the two branch points may be implemented as the following single "if" statement, which can typically be used to search numerous data frames 310 in a matter of microseconds:

```
if ((current_frame_bytes[4] == 0x06) &&
   (current_frame_bytes[12] == 0x08))
{
    // the current frame is similar to the input frame
}
else
{
    // the current frame is NOT similar to the input frame
}
```

Figure 3F:
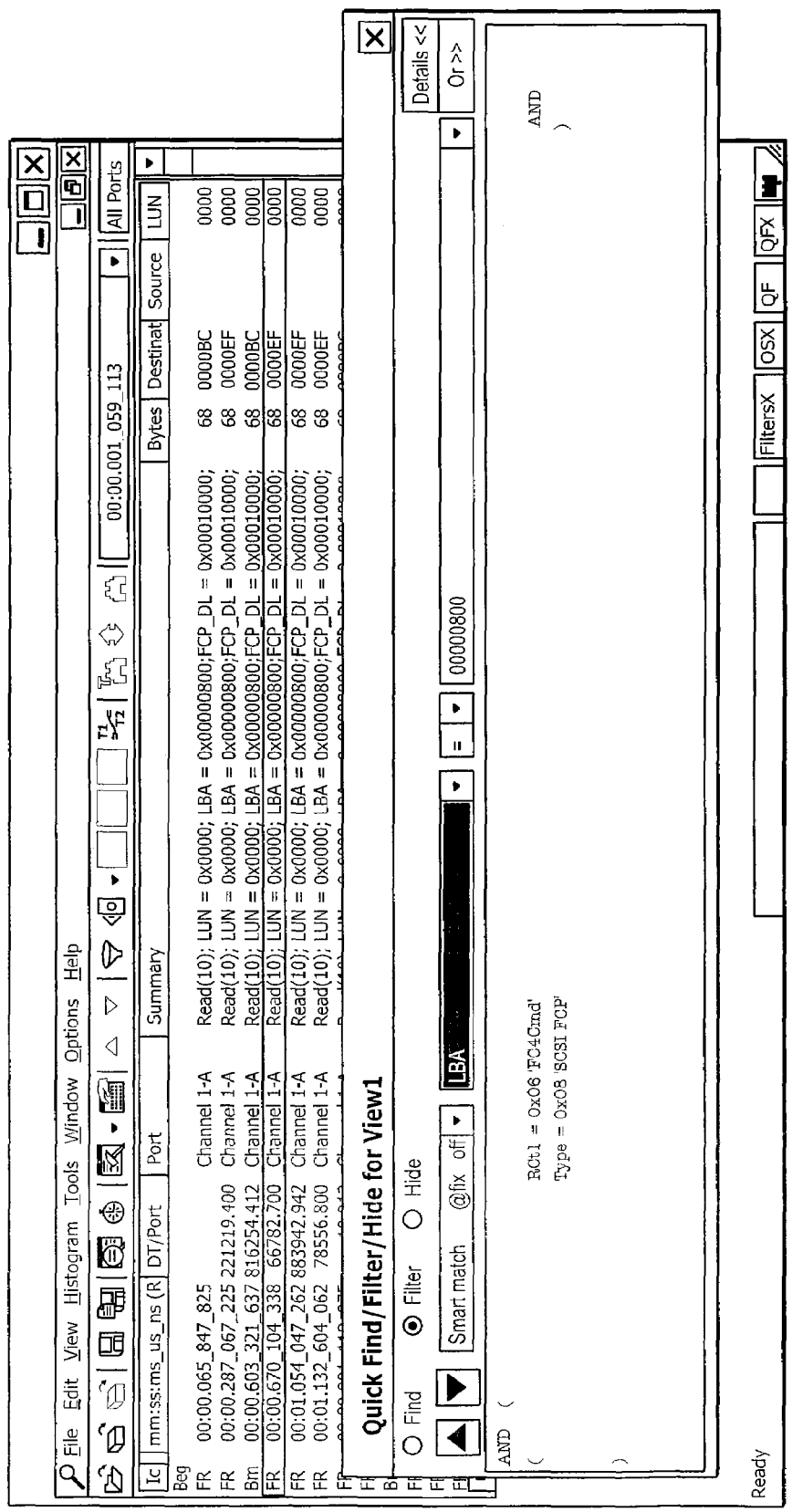

FIG. 3F shows an illustration of a graphical user interface that displays the results of a search conducted by the present example. Note that the specific protocol field LBA=0x800 and the additional protocol field and value pairs RCtl=0x06 and Type=0x08 that were generated automatically as discussed above were used to search the data frames 310. Further note, that substantially all of the data frames 310 shown in FIG. 3F include the specific protocol field LBA=0x800.

Figure 4:
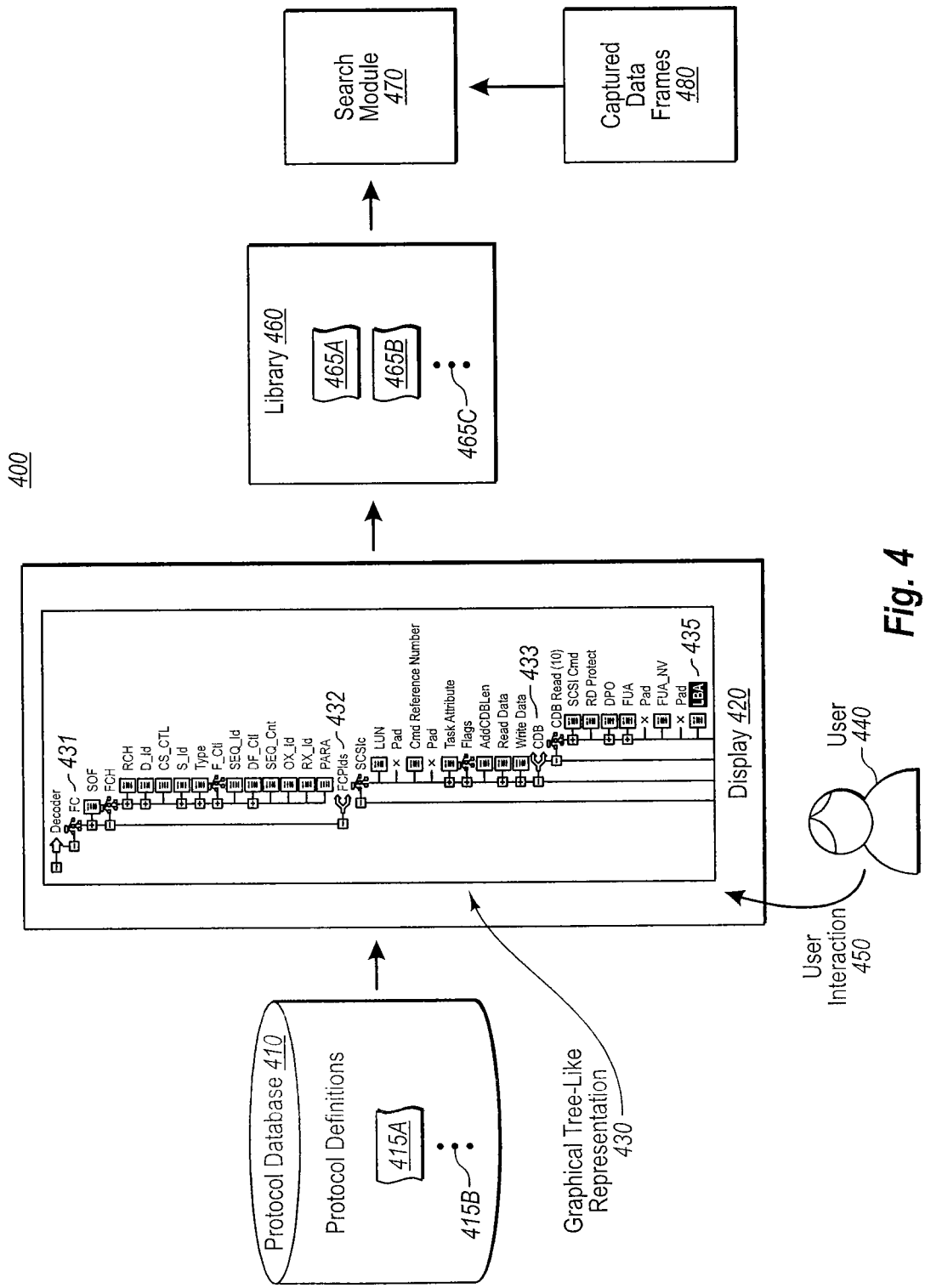
FIG. 4 illustrates a computing system in which alternative embodiments disclosed herein may be performed.

Turning now to FIG. 4, a computing system 400 that may be implemented to practice alternative embodiments disclosed herein is illustrated. Computing system 400 depicts various modules and components that may be used when implementing the embodiments. Note that computing system 400 is illustrated by way of example only and should not be used to limit the scope of the appended claims or any of the embodiments disclosed herein. The various modules and components of computing system 400 may be located in a protocol analyzer 110 or within a personal computer attached to control protocol analyzer 110 as described above. In some embodiments, the various modules and components of computing system 400 may be distributed across multiple computers interconnected via the internet or other wide area or local network.

As illustrated, computing system 400 includes a protocol database 410, which may include protocol definitions 415A and any number of additional protocol definitions as represented by ellipses 415B. Protocol database 410 and protocol definitions 415 may correspond to and/or are similar to the protocol definition database 220 previously discussed and need not be discussed further here.

Computing system 400 also includes a display 420, which may correspond to display 190, although this is not required. Display 420 may be utilized to display the protocol database 410. As shown in FIG. 4, a protocol database 410 may be displayed as a graphical tree-like representation or structure 430 such as those disclosed in U.S. Pat. No. 6,931,574.

The graphical tree-like representation 430 may be configured to include one or more sub-branches. The one or more sub-branches of the tree-like representation 430 may define various protocol fields that are included in the data frames that the protocol definitions represents. In addition, sub-branches may be embedded within other sub-branches of the tree-like representation 430.

The computing system 400, specifically the graphical tree-like representation 430 may then receive some user interaction from 450 from a user 440. Note that the user 440 may be a single user or a group of users. The user 440 may also be one or more human users or may be one or more computing entities or other non-human users.

The user interaction 450 may select one or more paths of sub-branches that lead to a user desired kind of frame or specific protocol field. For example, referring to FIG. 4, a user may desire to locate a LBA protocol field (denoted as 435). The received user interaction 450 would select a path that included the FC sub-branch (denoted as 431), the SCSIc sub-branch (denoted as 432), and the CDB Read (10) sub-branch (denoted as 433) before locating the LBA specific protocol field 435. Other paths not illustrated may also be selected.

The computing system 400 may then identify those common protocol fields that are commonly encountered in the path of sub-branches that lead to the specific protocol field 435. For example, as previously described, the RCtl=0x06, Type=0x08, and SCSI Cmd protocol fields would be encountered before encountering the LBA field.

In some embodiments, user input 250 is then received that causes the commonly encountered sub-branches to be stored in memory 160 as a library 460 of search criteria 465A, 465B, and potentially any additional number of search criteria as represented by search criteria 465C. The search criteria 465 may then be used at a later time by a search module 470, which may correspond to search module 250, to search one or more captured data frames 480. Advantageously, the process just described allows a user to analyze the protocol definitions to create search criteria that can then be used to search captured data frames without having to first identify a particular data frame for searching.

The embodiments described herein may also be described in terms of methods comprising functional steps and/or non-functional acts. Some of the following sections provide descriptions of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowchart for FIGS. 5-7—is used to indicate the desired specific use of such terms.

Figure 5:
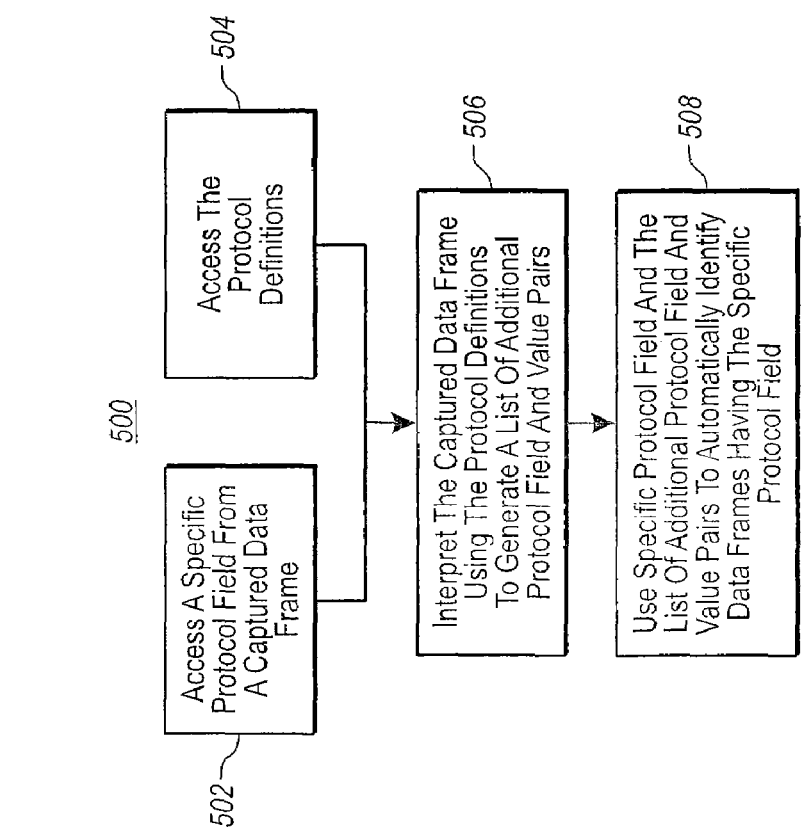
FIG. 5 illustrates a method for automatically generating a list of search criteria to be used by a computing system when searching data frames for one or more resulting data frames having a specific protocol field in accordance with embodiments disclosed herein.

Turning now to FIG. 5, a flowchart of a method 500 for automatically generating search criteria to be used by a computing system when searching captured data frames for a specific protocol field is illustrated. Method 500 will be described in relation to the computing system of FIGS. 1 and 2, although this is not required as the method 500 may be performed on numerous computing systems.

Method 500 includes an act of accessing a specific protocol field from a captured data frame (act 502). For example, interpret module 230 may access a specific protocol field to search for 212 by accessing the captured data frame 210B. For instance, in a capture of SCSI traffic over Fibre Channel, the specific protocol field to search for 212 may be a SCSI Logical Unit (LUN) such as LUN=0x0000 or a Logical Block Address (LBA) field such as LBA=0x800.

Method 500 also includes an act of accessing the protocol database (act 504). For example, interpret module 230 may access the protocol definitions of protocol database 220. As mentioned, the protocol definitions define frame formats for at least some captured data frames by specifying the interrelationships between the protocol fields that are included in the data frames. In some embodiments, the protocol definitions may be structured in a tree-like hierarchical structure.

Method 500 further includes an act of interpreting the captured data frame using the protocol definitions to generate a list of additional protocol field and value pairs to use for searching at least some captured data frames (act 506). For example, interpret module 230 may interpret captured data frame 210B using protocol definitions from protocol database 220. As previously discussed, the interpretation allows the interpretation module 230 to automatically ascertain additional protocol field and value pairs in addition to the specific protocol field to search for 212 that may be used to help search for those captured data frames that include the specific protocol field to search for 212. A list of the additional protocol field and value pairs 240 may then be generated by the interpret module 230.

In some embodiments, the process of generating the additional protocol field and value pairs may be an iterative process. In other words, the interpret module may identify additional protocol field and value pairs during one time period and may then add or eliminate additional protocol field and value pairs at a later time period. Accordingly, the actual additional protocol field and value pairs that are ultimately provided to a search module need not have been identified at the same time or include all the additional protocol field and value pairs that have been identified.

In addition, method 500 includes an act of using the specific protocol field and the list of additional protocol field and value pairs to automatically identify the one or more resulting data frames having the specific protocol field (act 508). For example, the list of additional protocol and value pairs 240 may be provided to search module 250. The search module may use the additional protocol and value pairs and the specific protocol field to automatically identify additional captured data frames that include the specific protocol field.

In some embodiments, the list of additional protocol fields and value pairs 240 that are provided to search module 250 are translated into fixed length values at fixed byte offsets in captured data frame 210B. The search module then uses the fixed length values at fixed byte offsets to find the other captured data frames 210 that include the fixed length values at the fixed byte offsets.

In some embodiments, method 500 may further include an act of filtering the list of additional protocol field and value pairs 240. For example a filter 260 may determine a number of different kinds of frame also containing the field to search for 212 and it may determine the list of additional field and value pairs 240 for each of those. From all the lists of additional field and value pairs, only the common fields are retained, but each common field may have 1 or more possible values. In a further step, if a particular protocol field has more than a predetermined number of values, which may be ten in some embodiments, then the particular protocol field and all its associated values are removed from the list of additional protocol and value pairs 245. Of course, any protocol field with less than the predetermined number of associated values would not be removed from list 245.

Figure 6:
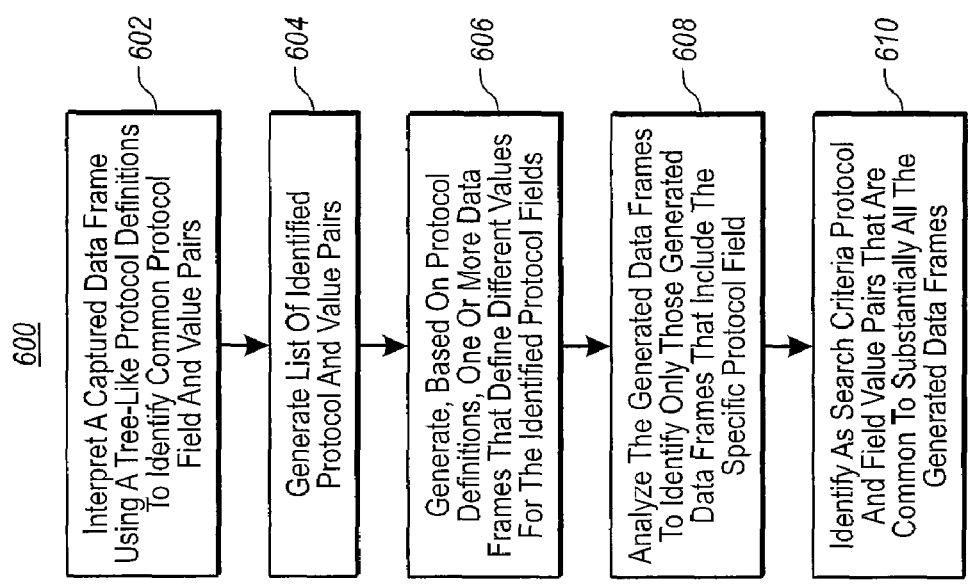
FIG. 6 illustrates an alternative and refinement of the method in FIG. 5 for automatically generating a list of search criteria to be used by a computing system when searching data frames for one or more resulting data frames having a specific protocol field in accordance with embodiments disclosed herein.

Referring now to FIG. 6, a specific embodiment of a method for a computing system to automatically generate search criteria to be used by a computing system when searching captured data frames for a specific protocol field is illustrated. Method 600 will be described in relation to the computing system of FIGS. 1, 2 and 3; although this is not required as the method 500 may be performed on numerous computing systems.

Method 600 includes an act of interpreting the captured data frame using a hierarchical tree-like protocol definitions to identify those protocol field and value pairs that are common in any path to a location of the specific protocol field in the hierarchical tree-like structure (act 602). For example, the interpret module 230 may interpret a tree-like protocol definitions 305 to identify those branch point fields 306-308 that are common in any path to the specific protocol field 302. As mentioned above, the RCtl=0x06, the Type=0x08, and the SCSI Cmd=0x28 are branch points that are identified for the LBA=0x800 field.

Method 600 also includes an act of generating a list of the identified protocol field and value pairs (act 604) and an act of generating, based on the protocol definitions, one or more data frames that include different values for the identified protocol fields (act 606). For example, interpret module 230 may generate a list 240 that includes the values described above. The filter module 260 may use the protocol definitions 305 to determine substantially all the different possible values that the protocol fields identified in act 602 may have based on the protocol definitions 305. The filter module 260 may then generate one or more data frames that include these protocol fields and all the determined values.

Method 600 further includes an act of analyzing the generated one or more data frames to identify only those generated data frames that include the specific protocol field to search for 212 (act 608) and an act of identifying as search criteria protocol field and value pairs that are common to substantially all the generated data frames (act 610). For example, filter module 260 may identify only those generated data frames that include the specific protocol field to search for 212. For instance, only those generated data frames that included the LBA=0x800 field would be identified. The filter module 260 may then identify as search criteria those protocol and value pairs that are common to substantially all the generated data frames as was explained above in relation to FIGS. 3A-3F.

In some embodiments, method 600 may also include an act of ascertaining the number of different values that an identified protocol field has. The method 600 may then eliminate any protocol fields that have more than a predetermined number of values, which may be ten in some embodiments, from the list 240 of search criteria.

Figure 7:
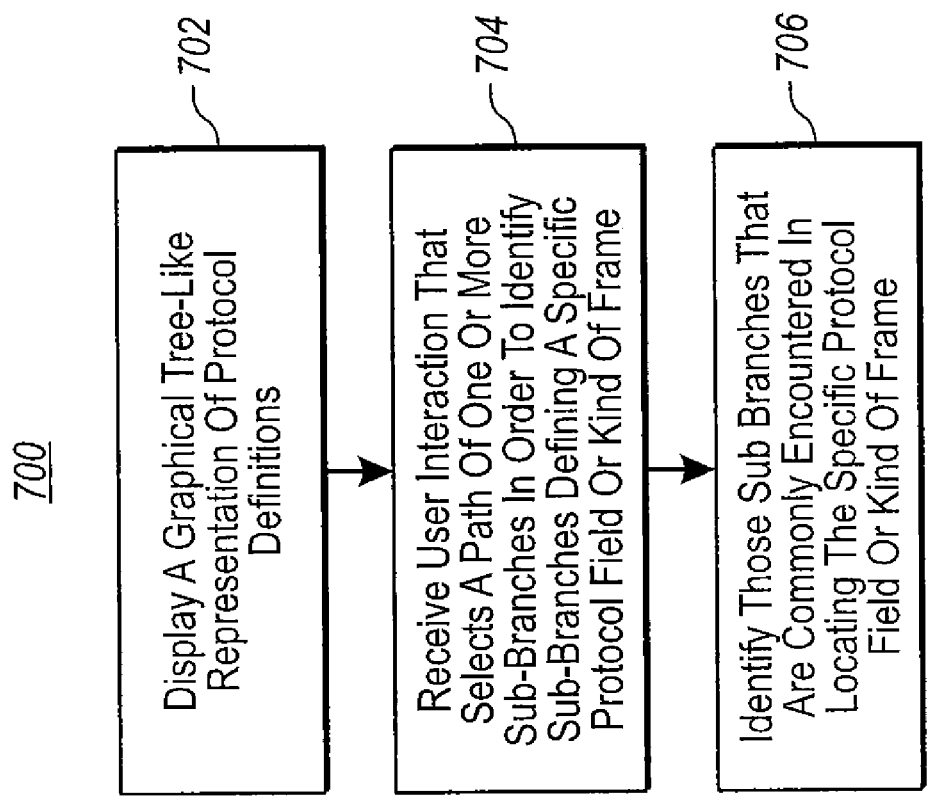
FIG. 7 illustrates a method for analyzing protocol definitions to automatically generate a library of search criteria for use in searching data frames for a specific kind of frame or protocol field.

Referring now to FIG. 7, a method 700 for a computing system to analyze protocol definitions to automatically generate a library of search criteria for use in searching at least some data frames for a specific kind of frame or frames containing a specific protocol field is illustrated. Method 700 will be described with frequent reference to the computing system of FIG. 4, although this is for illustration only. It will be appreciated that method 700 may be performed in any number of additional computing systems.

Method 700 includes displaying 702 a graphical tree-like representation of a protocol definitions. The graphical tree-like representation may be configured such that sub-branches of the tree-like representation define protocol fields of captured data frames. Further, the sub-branches may be embedded within other sub-branches. For instance, a graphical tree-like representation 430 of protocol definitions 415 may be displayed on display 420.

Method 700 also includes receiving 704 user interaction that selects a path of one or more sub-branches of the graphical tree-like representation in order to identify the one or more sub-branches defining a user desired specific protocol field. For example, user 440 may provide user interaction 450 that selects one or more paths of sub-branches in order to locate a specific protocol field 435 as explained previously.

Method 706 further includes identifying 706 those protocol fields that are commonly encountered in the path of the one or more sub-branches before encountering the one or more sub-branches defining the user desired specific protocol field. For example, those common sub-branches 465 may be identified as previously described.

In some embodiments, user interaction 450 may be received that causes the identified common sub-branches 465 to be stored in a library of search criteria 460. The search criteria may then be used at a later time by the search module 470 to search the captured data frames 470 for the specific protocol field 435 as discussed previously.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system having access to a plurality of captured data frames present on a communication network that have been captured by a protocol analyzer, at least a subset of the captured data frames being search data frames that are to be searched, the search data frames being structured in accordance with different protocol definitions, the search data frames being structured to include one or more protocol fields structured in accordance with its corresponding protocol definitions, the computing system also having access to a database of protocol definitions that define frame formats for the search data frames by specifying a relationship between the protocol fields of the search data frames, a method for automatically generating a list of search criteria to be used by the computing system when searching the search data frames for one or more resulting data frames having a specific protocol field, the method comprising:

an act of accessing a specific protocol field from one of the captured data frames;

an act of accessing the protocol definitions;

an act of interpreting the captured data frame using the protocol definitions to generate a list of additional protocol field and value pairs to use for searching the search data frames; and an act of using the specific protocol field and the list of additional protocol field and value pairs to automatically identify the one or more resulting data frames having the specific protocol field.

2. The method in accordance with claim 1 further comprising:

an act of filtering the list of additional protocol field and value pairs such that any protocol field with more than a predetermined number of values is removed from the list of additional protocol field and value pairs.

3. The method in accordance with claim 1, wherein the protocol definitions are configured in a hierarchical tree-like structure, the act of interpreting the captured data frame using the protocol definitions to generate a list of additional protocol field and value pairs to use for searching the search data files comprising:

act of interpreting the captured data frame using the hierarchical tree-like protocol definitions to identify those protocol field and value pairs that are common in any path to a location of the specific protocol field in the hierarchical tree-like structure an act of generating a list of the identified protocol field and value pairs.

4. The method in accordance with claim 3 further comprising:

an act of generating, based on the protocol definitions, one or more data frames that include different values for the identified protocol fields;

an act of analyzing the generated one or more data frames to identify only those generated data frames that include the specific protocol field; and an act of identifying as search criteria protocol field and value pairs that are common to substantially all the generated data frames.

5. The method in accordance with claim 4 further comprising:

an act of ascertaining the number of different values that an identified protocol field has; and an act of eliminating any identified protocol fields with more than a predetermined number of values from the search criteria.

6. The method in accordance with claim 1, wherein the act of using the specific protocol field and value pair and the list of additional protocol field and value pairs to automatically identify the one or more resulting data frames having the specific protocol field comprises:

an act of translating the additional protocol field and value pairs into fixed length values at a fixed byte offset in the captured data frame; and an act of finding those search data frames that include the fixed length values at the fixed byte offset in the search data frames.

7. A computer program product for use in a computing environment including a computing system having access to a plurality of captured data frames present on a communication network that have been captured by a protocol analyzer, at least a subset of the captured data frames being search data frames that are to be searched, the search data frames being structured in accordance with different protocol definitions, the search data frames being structured to include one or more protocol fields structured in accordance with its corresponding protocol definition, the computing system also having access to a database of protocol definition files that define frame formats for the search data frames by specifying a relationship between the protocol fields of the search data frames, the computer program product for implementing a method for allowing the computing system to automatically generate a list of search criteria to be used by the computing system when searching the search data frames for one or more resulting data frames having a specific protocol field, the computer program product comprising one or more computer-readable media having thereon computer-executable instructions that, when executed by one or more processors of the computing environment, cause the computing environment to perform the method, the method comprising:

an act of accessing a specific protocol field from one of the captured data frames;

an act of accessing the protocol definitions;

an act of interpreting the captured data frame using the protocol definitions to generate a list of additional protocol field and value pairs to use for searching the search data frames; and an act of using the specific protocol field and the list of additional protocol field and value pairs to automatically identify the one or more resulting data frames having the specific protocol field.

8. A computer program product in accordance with claim 7, wherein the computer-readable media has thereon computer-executable instructions that, when executed by the one or more processors, further cause the computing system to perform the following:

an act of filtering the list of additional protocol field and value pairs such that any protocol field with more than a predetermined number of values is removed from the list of additional protocol field and value pairs.

9. A computer program product in accordance with claim 7, wherein the protocol definitions are configured in a hierarchical tree-like structure, wherein the act of interpreting the captured data frame using the protocol definitions to generate a list of additional protocol field and value pairs to use for searching the search data files comprises the following:

an act of interpreting the captured data frame using the hierarchical tree-like protocol definitions to identify those protocol field and value pairs that are common in any path to a location of the specific protocol field in the hierarchical tree-like structure; and an act of generating list of the identified protocol field and value pairs.

10. A computer program product in accordance with claim 9, wherein the computer-readable media has thereon computer-executable instructions that, when executed by the one or more processors, further cause the computing system to perform the following:

an act of generating, based on the protocol definitions, one or more data frames that include different values for the identified protocol fields;

an act of analyzing the generated one or more data frames to identify only those generated data frames that include the specific protocol field; and an act of identifying as search criteria protocol field and value pairs that are common to substantially all the generated data frames.

11. A computer program product in accordance with claim 10, wherein the computer-readable media has thereon computer-executable instructions that, when executed by the one or more processors, further cause the computing system to perform the following:

an act of ascertaining the number of different values that an identified protocol field has; and an act of eliminating any identified protocol fields with more ten values from the search criteria.

12. The method in accordance with claim 7, wherein the act of using the specific protocol field and value pair and the list of additional protocol field and value pairs to automatically identify the one or more resulting data frames having the specific protocol field comprises:
   an act of translating the additional protocol field and value pairs into fixed length values at a fixed byte offset in the captured data frame; and
   an act of finding those search data frames that include the fixed length values at the fixed byte offset.

13. A computer program product in accordance with claim 7, wherein the one or more computer-readable media is one of physical memory media, physical storage media, or recordable media.

14. In a computing system including a protocol definition database that includes a plurality of protocol definitions, the plurality of protocol definitions defining interrelationships of protocol fields that are included in data frames of network traffic, a method for analyzing the protocol definitions to automatically generate a library of search criteria for use in searching at least some of the data frames for a specific kind of frame or a frame containing a specific protocol field, the method comprising:
   displaying a graphical tree-like representation of protocol definitions, wherein the graphical tree-like representation is configured such that sub-branches of the tree-like representation define protocol fields of at least some of the data frames and wherein sub-branches may be embedded within other sub-branches;
   receiving user interaction that selects a path of one or more sub-branches of the graphical tree-like representation in order to identify the one or more sub-branches defining a user desired specific kind of frame or protocol field; and
   the computing system identifying those protocol fields that are commonly encountered in the path of the one or more sub-branches before encountering the one or more sub-branches defining the user desired specific kind of frame or protocol field.

15. The method in accordance with claim 14 further comprising:
   receiving user input that causes the identified commonly encountered protocol fields to be stored in a memory as a library of search criteria for the specific kind of frame or protocol field.

16. The method in accordance with claim 15, wherein the library of search criteria is accessible by the computing system and is used to search at least some of a plurality of captured data frames for the specific kind of frame or protocol field.

17. The method in accordance with claim 14 further comprising:
   receiving user input that causes the identified commonly encountered protocol fields to be used as search criteria by the computing system to search at least some of a plurality of captured data frames for the specific kind of frame or protocol field.

18. A computer program product comprising computer executable instructions that when executed are capable of implementing the method of claim 14.

* * * * *